US010496906B2

(12) United States Patent
Nishihara et al.

(10) Patent No.: US 10,496,906 B2
(45) Date of Patent: Dec. 3, 2019

(54) INKJET PRINTER

(71) Applicant: Roland DG Corporation, Hamamatsu-shi, Shizuoka (JP)

(72) Inventors: Yuya Nishihara, Hamamatsu (JP); Katsuo Ikehata, Hamamatsu (JP); Yoshinari Ogura, Hamamatsu (JP); Yasuhito Fujita, Hamamatsu (JP); Seishin Yoshida, Hamamatsu (JP); Koji Takahashi, Hamamatsu (JP); Takeshi Yagi, Hamamatsu (JP)

(73) Assignee: ROLAND DG CORPORATION, Shizuoka (JP)

( * ) Notice: Subject to any disclaimer, the term of this patent is extended or adjusted under 35 U.S.C. 154(b) by 0 days.

(21) Appl. No.: 16/001,003

(22) Filed: Jun. 6, 2018

(65) Prior Publication Data

US 2018/0354262 A1 Dec. 13, 2018

(30) Foreign Application Priority Data

Jun. 7, 2017 (JP) .................. 2017-112686

(51) Int. Cl.
*B41J 2/14* (2006.01)
*G06K 15/10* (2006.01)
*B41J 2/21* (2006.01)
*C09D 11/324* (2014.01)

(52) U.S. Cl.
CPC .............. *G06K 15/107* (2013.01); *B41J 2/14* (2013.01); *B41J 2/21* (2013.01); *B41J 2/2117* (2013.01); *C09D 11/324* (2013.01)

(58) Field of Classification Search
CPC ....................................................... B41J 2/2117
See application file for complete search history.

(56) References Cited

U.S. PATENT DOCUMENTS

| 7,562,957 B2* | 7/2009 | Mills ..................... B41J 2/2114 347/15 |
|---|---|---|
| 2006/0227194 A1 | 10/2006 | Hoshino |
| 2009/0220695 A1 | 9/2009 | Oyanagi et al. |
| 2012/0200633 A1 | 8/2012 | Aoyama |
| 2013/0241988 A1* | 9/2013 | Mills ..................... B41J 2/2117 347/19 |
| 2015/0191024 A1* | 7/2015 | Heath ..................... H04N 1/60 347/15 |

FOREIGN PATENT DOCUMENTS

| JP | 2002-036517 A | 2/2002 |
|---|---|---|
| JP | 2006-289722 A | 10/2006 |

(Continued)

*Primary Examiner* — Shelby L Fidler
(74) *Attorney, Agent, or Firm* — Keating & Bennett, LLP

(57) ABSTRACT

An inkjet printer injects first ink of a plurality of colors and second ink. An extraction condition setter sets an extraction condition to extract a portion of, or an entirety of, ink dots of the first ink of each of the plurality of colors. An extractor extracts an underlying layer dot group from ink dots of the first ink of each of the plurality of colors based on the extraction condition. Such a plurality of underlying layer dot groups and ink dots of the second ink form a first printing layer. An image dot group including at least the ink dots, of the first ink, other than the underlying dot groups forms at least one additional printing layer.

17 Claims, 9 Drawing Sheets

(56) References Cited

FOREIGN PATENT DOCUMENTS

| | | |
|---|---|---|
| JP | 2009-113284 A | 5/2009 |
| JP | 2009-269397 A | 11/2009 |
| JP | 2010-240934 A | 10/2010 |
| JP | 2012-162002 A | 8/2012 |
| JP | 2013-067031 A | 4/2013 |
| JP | 2013-252640 A | 12/2013 |
| JP | 2013-256045 A | 12/2013 |

* cited by examiner

FIG.4

|  |  | Rp<br>EXTRACTION<br>RATIO | Ro<br>OVERLAPPING<br>RATIO |
|---|---|---|---|
| 104a → | 1ST EXTRACTION CONDITION | 105 30 % | 106 17 % |
| 104b → | 2ND EXTRACTION CONDITION | 30 % | 17 % |
| 104c → | 3RD EXTRACTION CONDITION | 30 % | 17 % |
| 104d → | 4TH EXTRACTION CONDITION | 30 % | 17 % |

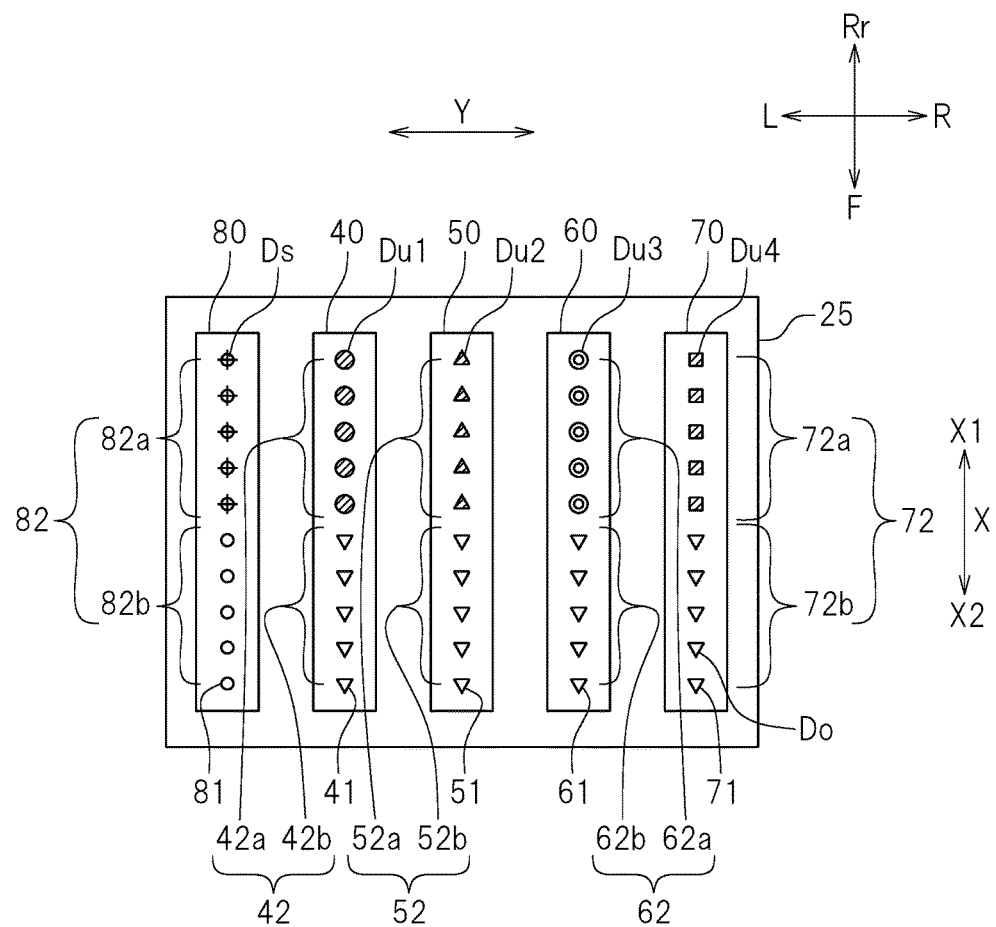

| | | Rp<br>EXTRACTION<br>RATIO | Ro<br>OVERLAPPING<br>RATIO |
|---|---|---|---|
| 104a → | 1ST EXTRACTION CONDITION | 30 % | 60 % |
| 104b → | 2ND EXTRACTION CONDITION | 30 % | 60 % |
| 104c → | 3RD EXTRACTION CONDITION | 30 % | 60 % |
| 104d → | 4TH EXTRACTION CONDITION | 30 % | 60 % |

105 points to EXTRACTION RATIO, 106 points to OVERLAPPING RATIO.

INKJET PRINTER

CROSS REFERENCE TO RELATED APPLICATIONS

This application claims the benefit of priority to Japanese Patent Application No. 2017-112686 filed on Jun. 7, 2017. The entire contents of this application are hereby incorporated herein by reference.

BACKGROUND OF THE INVENTION

1. Field of the Invention

The present invention relates to an inkjet printer.

2. Description of the Related Art

Conventionally, an inkjet printer for large format printing that includes a plurality of recording heads arrayed in a direction perpendicular to a scanning direction of a head unit is known. The inkjet printer having such a structure performs printing on a large area of a recording medium within a short time. Japanese Laid-Open Patent Publication No. 2013-67031 discloses an inkjet recording device including a plurality of head units arrayed in the scanning direction. The plurality of head units each include a plurality of recording heads arrayed in a feeding direction perpendicular to the scanning direction.

Some recording mediums such as cloth, paper and the like are not white. In the case where process color ink is directly injected onto such a non-white recording medium, the real color of the ink may not be provided. According to a technique for dealing with this situation, a recording head injecting white ink is added to the printer described in Japanese Laid-Open Patent Publication No. 2013-67031. With this technique, first, a white ink layer is formed on the recording medium. After the white ink layer is formed on the recording medium, an image layer of process color ink is formed on the white ink layer. In this manner, a color close to the real color of the ink can be printed even on a recording medium that is not white.

Usually, the above-described technique provides a sufficiently high level of image quality even on a recording medium that is not white. However, a still higher level of image quality may be desired for some uses of the printed item. In the field of, for example, outdoor advertisements or the like, there is a need for an image giving a strong impression of having depth or massiveness in order to attract more attention. However, often times, the conventional printing method does not fulfill such a need. A reason for this is that the image layer is thin and thus the influence of special color ink forming the underlying color layer is not completely eliminated. For example, in the case where the special color ink is white ink, the image appears whitish and thus lacks massiveness. In order to deal with such a situation, the present inventors conceived of a method of printing an underlying color layer with a portion of an image being mixed in the underlying color layer. More specifically, according to this method, a portion of ink dots of process color ink used to form the image is extracted by use of a mask and printed concurrently with the underlying color layer, and then the image is printed as being piled up on the underlying color layer. The present inventors have discovered that the above-described method can provide printing with more massiveness than by conventional piled-up printing.

However, a printed item provided by the above-described method may involve the following problem. The image printed as being mixed in the underlying color layer (hereinafter, such an image will be referred to as an "underlying image") is formed of a portion of the ink dots of the process color ink. Therefore, as seen on an ink dot-by-ink dot basis, the printed item includes points to which the ink has been injected and points to which the ink has not been injected. For this reason, an extraction pattern including the points to which the ink has been injected and the points to which the ink has not been injected may be visually recognized as a graphical pattern. The graphical pattern appears because a portion of the ink dots is extracted and the remaining portion of the ink dots is not extracted. Even after the image to form an upper layer (hereinafter, such an image will be referred to as a "subject image") is printed as being piled up on the underlying image, the graphical pattern may still appear.

SUMMARY OF THE INVENTION

Preferred embodiments of the present invention provide inkjet printers that provide a high quality image with more certainty by piled-up printing.

An inkjet printer according to a preferred embodiment of the present invention includes a recording head including a first color ink head to form ink dots of first ink of a first color on a recording medium, a second color ink head to form ink dots of first ink of a second color on the recording medium, and a second ink ink head (ink head for second ink) to form ink dots of second ink on the recording medium; a moving mechanism to move the recording head and the recording medium with respect to each other; and a controller connected with the recording head and the moving mechanism to control the recording head and the moving mechanism. The first color ink head includes a plurality of nozzles through which the first ink of the first color is injected toward the recording medium. The second color ink head includes a plurality of nozzles through which the first ink of the second color is injected toward the recording medium. The second ink ink head includes a plurality of nozzles through which the second ink is injected toward the recording medium. The controller includes a first setter to set a first extraction condition; a second setter to set a second extraction condition different from the first extraction condition; a first extractor to extract a first underlying layer dot group from the ink dots of the first ink of the first color based on the first extraction condition; a second extractor to extract a second underlying layer dot group from the ink dots of the first ink of the second color based on the second extraction condition; a first printing configured or programmed to form a first printing layer on the recording medium; and at least one additional printing controller each configured or programmed to form one additional printing layer above or below the first printing layer. The first extraction condition is provided to extract a portion of, or an entirety of, the ink dots of the first ink of the first color. The second extraction condition is provided to extract a portion of, or an entirety of, the ink dots of the first ink of the second color. The first printing controller forms the first printing layer of at least the first underlying layer dot group, the second underlying layer dot group and the ink dots of the second ink. The at least one additional printing controller each forms one additional printing layer, above or below the first printing layer, of an image dot group including at least the ink dots, of the first ink of the first color, other than the first underlying layer dot group and including the ink dots, of the first ink of the second color, other than the second underlying layer dot group.

According to the above-described inkjet printer, the second ink and a portion of the first ink (underlying layer dot groups) are printed concurrently to form the "first printing layer". Another portion of the first ink (image dot group) is printed to form the "another printing layer" above or below the "first printing layer". The underlying dot groups form an underlying image. The image dot group forms a subject image. In this manner, the underlying image and the subject image are printed in a piled-up manner, so that an image appearing to be more massive than by conventional piled-up printing is provided. Also according to the above-described inkjet printer, to extract the underlying layer dot group from the ink dots of the first ink, the extraction condition is able to be set independently for each color of the first ink. In the case where the ink dots of all the colors of the first ink are extracted by use of the same mask pattern, a graphical pattern may appear in the underlying image due to the extraction pattern. The above-described inkjet printer is able to significantly reduce or prevent the appearance of the graphical pattern as described above. For example, even if any graphical pattern appears due to the extraction pattern for one color, another extraction condition may be set for another color, so that another graphical pattern appear. As a result, appearance of the graphical patterns is able to be significantly reduced or prevented in the entirety of the image.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 4 shows an example of extraction condition setting screen.

FIG. 8 shows how the ink is injected in "first piled-up printing".

DETAILED DESCRIPTION OF THE PREFERRED EMBODIMENTS

Figure 1:
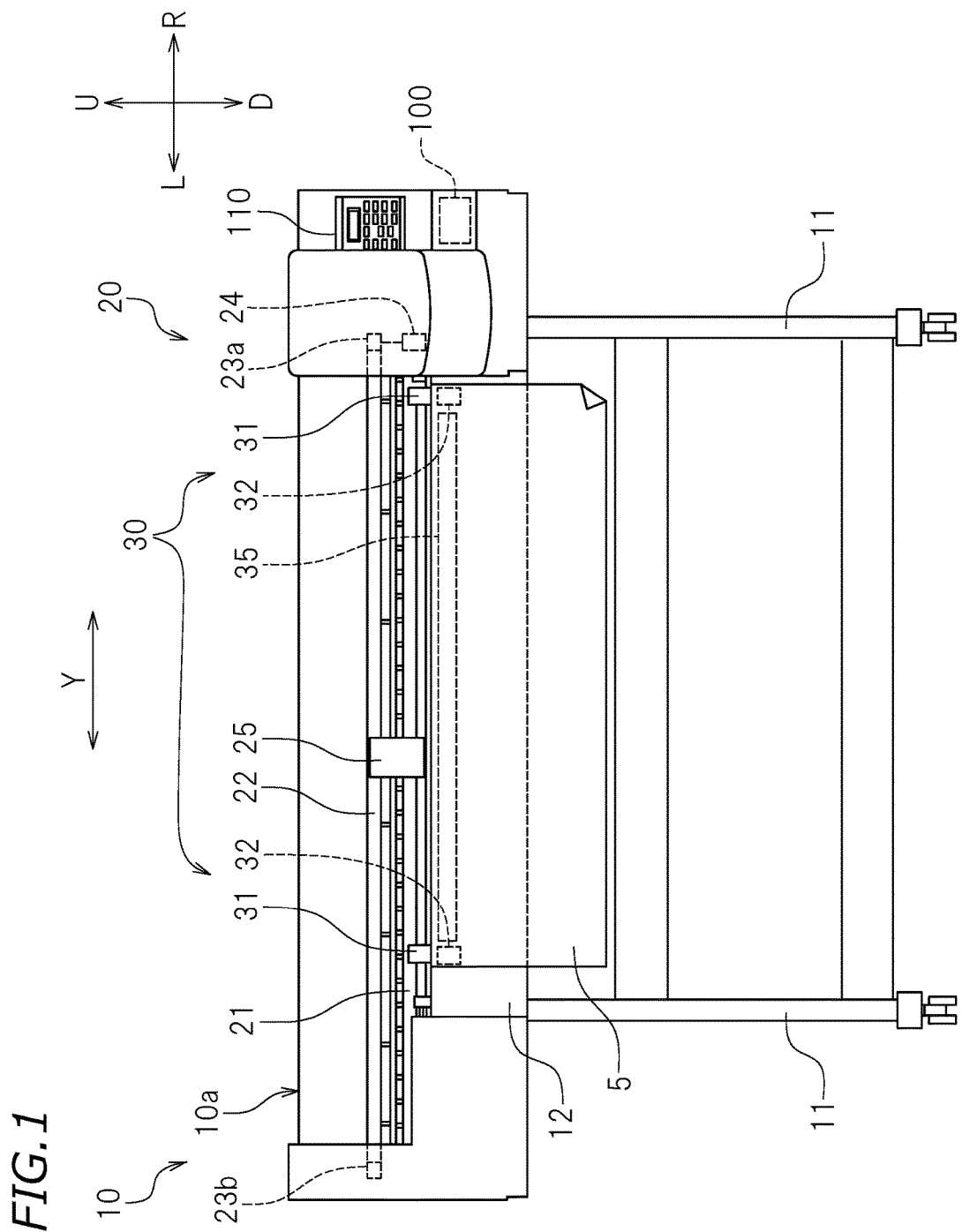
FIG. 1 is a front view of an inkjet printer in preferred embodiment 1 of the present invention.

Hereinafter, preferred embodiments of an inkjet printer according to the present invention will be described with reference to the drawings. The preferred embodiments described below are not intended to specifically limit the present invention, needless to say. Components and portions that have the same functions will bear the same reference signs, and overlapping descriptions will be omitted or simplified. In the following description, a direction from an inkjet printer toward a user facing a front surface of the inkjet printer is referred to as "forward", and a direction distanced from the user is referred to as "rearward". In the drawings, letter Y refers to a scanning direction, and letter X refers to a feeding direction perpendicular to the scanning direction. In the drawings, letters F, Rr, L, R, U and D respectively refer to "front", "rear", "left", "right", "up" and "down". These directions are also based on the user facing the front surface of the inkjet printer. It should be noted that these directions are provided merely for the sake of convenience, and do not limit the manner of installation of the inkjet printer in any way. The expression that one component is "above" (or "below") another component may refer to a state where the one component is above (or below) the another component while being in direct contact with the another component, as well as a state where the one component is above (or below) the another component while having still another component provided between the one component and the another component.

Preferred Embodiment 1

FIG. 1 is a front view of a large-scale inkjet printer (hereinafter, referred to a "printer") 10 in preferred embodiment 1. The printer 10 sequentially moves a rolled recording medium 5 forward (toward a downstream side X2 in the feeding direction X; see FIG. 2), while injecting ink from ink heads 40, 50, 60, 70 and (see FIG. 2) mounted on a carriage 25 moving in the scanning direction Y, to print an image on the recording medium 5.

The recording medium 5 is a target on which an image is to be printed. There is no specific limitation on the type of the recording medium 5. The recording medium 5 may be, for example, paper such as plain paper, printing paper for an inkjet printer, or the like. The recording medium 5 may be a transparent sheet formed of a resin, glass or the like. The recording medium 5 may be a sheet formed of a metal material, rubber or the like. In this preferred embodiment, the recording medium 5 is a transparent sheet.

As shown in FIG. 1, the printer 10 includes a printer main body 10a and legs 11 supporting the printer main body 10a. The printer main body 10a extends in the scanning direction Y. The printer main body 10a includes a guide rail 21 and the carriage 25 engaged with the guide rail 21. The guide rail 21 extends in the scanning direction Y. The guide rail 21 guides the carriage 25 such that the carriage 25 moves in the scanning direction Y. An endless belt 22 is secured to the carriage 25. The belt 22 is wrapped along, and extends between, a pulley 23a provided at a right end of the guide rail 21 and a pulley 23b provided at a left end of the guide rail 21. A carriage motor 24 is attached to the right pulley 23a. The carriage motor 24 is electrically connected with a controller 100. The carriage motor 24 is controlled by the controller 100. When the carriage motor 24 is driven, the pulley 23a is rotated to run the belt 22. As a result, the carriage 25 moves in the scanning direction Y along the guide rail 21. Along with the movement of the carriage 25 in the scanning direction Y, the ink heads 40 through 80 also move in the scanning direction Y. In this preferred embodiment, the belt 22, the pulley 23a, the pulley 23b and the carriage motor 24 are included in an example of carriage moving mechanism 20 moving the carriage 25 and the ink heads 40 through 80, mounted on the carriage 25, in the scanning direction Y.

A platen 12 is located below the carriage 25. The platen 12 extends in the scanning direction Y. The recording medium 5 is to be placed on the platen 12. Pinch rollers 31 pressing the recording medium 5 from above are provided above the platen 12. The pinch rollers 31 are located to the rear of the carriage 25. The platen 12 is provided with grit rollers 32. The grit rollers 32 are located below the pinch rollers 31. The grit rollers 32 are located at a position facing the pinch rollers 31. The grit rollers 32 are coupled with a feed motor 33 (see FIG. 3). The grit rollers 32 are rotatable upon receipt of a driving force of the feed motor 33. The feed motor 33 is electrically connected with the controller 100. The feed motor 33 is controlled by the controller 100. When the grit rollers 32 are rotated in the state where the recording medium 5 is held between the pinch rollers 31 and the grit rollers 32, the recording medium 5 is fed in the feeding direction X. In this preferred embodiment, the pinch rollers 31, the grit rollers 32 and the feed motor 33 are included in an example of feeding mechanism 30 moving the recording medium 5 in the feeding direction X. The feeding mechanism 30 and the carriage moving mechanism 20 are included in a moving mechanism moving the recording medium 5 and the carriage 25 with respect to each other.

Figure 2:
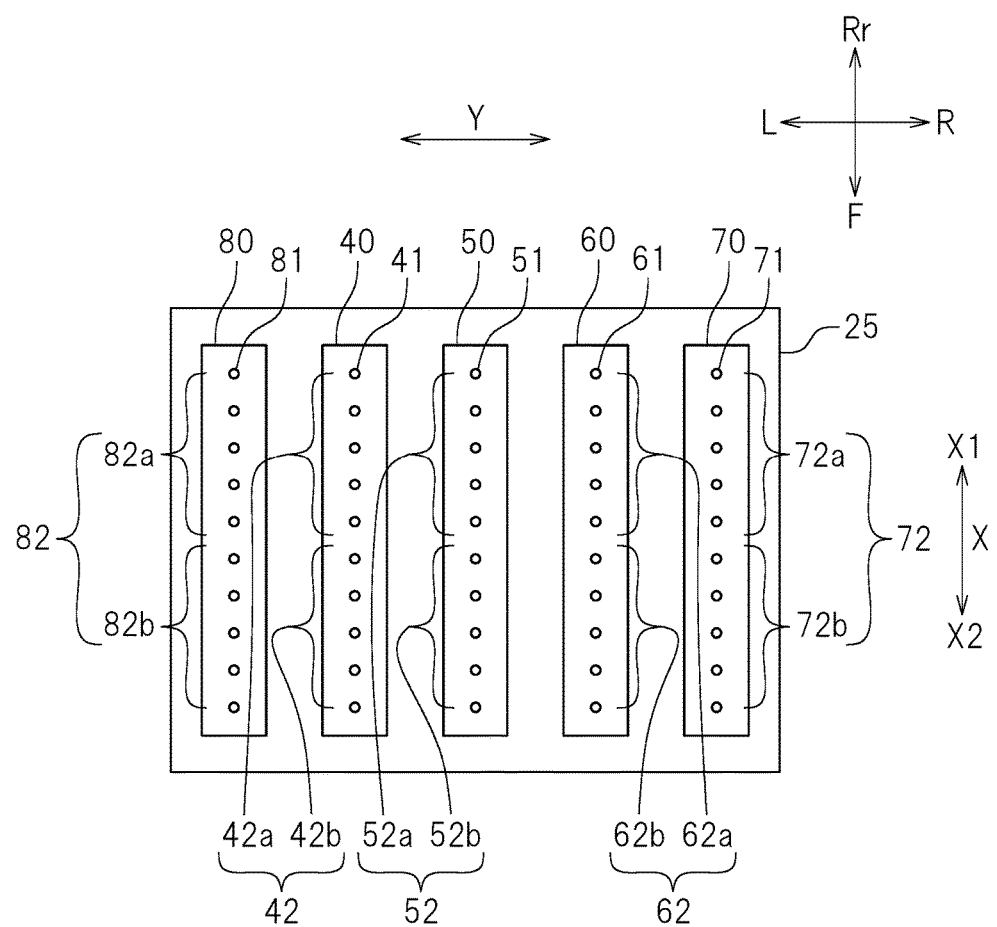
FIG. 2 is a schematic view showing a structure of a bottom surface of a carriage.

FIG. 2 is a schematic view showing a structure of a surface of the carriage 25 that faces the recording medium 5 (in this preferred embodiment, a bottom surface of the carriage 25). As shown in FIG. 2, the carriage 25 holds, at the bottom surface, the ink heads 40 through 80, more specifically, a first process color ink head 40, a second process color ink head 50, a third process color ink head 60, a fourth process color ink head 70, and a special color ink head 80. As shown in FIG. 2, the first process color ink head 40 through the fourth process color ink head 70 and the special color ink head 80 are located side by side in the scanning direction Y on the carriage 25. The first process color ink head 40, the second process color ink head 50, the third process color ink head 60, the fourth process color ink head 70, and the special color ink head 80 are included in a recording head. Herein, the "first process color ink head" refers to the ink head for the first process color, and this is applicable to the other ink heads.

In this preferred embodiment, the special color ink head 80 injects so-called special color ink that changes the color tone or the design of a color image. The special color ink is an example of "second ink". In this example, the special color ink head 80 injects white ink. The color tone of the special color ink is not limited to white. The "special color ink" encompasses ink other than the process color ink such as C ink, M ink, Y ink, K ink or the like, for example, metallic ink such as silver ink, gold ink or the like and transparent ink. In this preferred embodiment, one special color ink head is provided. The number of the special color ink head(s) is not limited to one. For example, two or more special color ink heads may be provided. There is no limitation on the color tone of the special color ink. The special color ink head 80 may inject, for example, metallic ink such as silver ink, gold ink or the like or transparent ink.

As shown in FIG. 2, the special color ink head 80 includes a plurality of nozzles 81 arrayed in the feeding direction X. In the special color ink head 80 in this preferred embodiment, the plurality of nozzles 81 are arrayed in one line to define a nozzle array 82. There is no limitation on the positional arrangement of the nozzles 81. The nozzles array 82 includes a special color upstream nozzle array 82a located on an upstream side X1 in the feeding direction X, and a special color downstream nozzle array 82b located on the downstream side X2 in the feeding direction X. In this preferred embodiment, the number of the nozzles 81 in the special color upstream nozzle array 82a and the number of the nozzles 81 in the special color downstream nozzle array 82b are equal to each other. The number of the nozzles 81 in the special color upstream nozzle array 82a and the number of the nozzles 81 in the special color downstream nozzle array 82b do not need to be equal to each other. Herein, the "special color upstream nozzle array" refers to the upstream nozzle array for the special color, and this is applicable to the special color downstream nozzle array, and also to first through fourth process color upstream nozzle arrays and first through fourth process color downstream nozzle arrays described below.

The first process color ink head 40 through the fourth process color ink head 70 each inject process color ink to form a color image. The process color ink is an example of "first ink". In this preferred embodiment, the first process color ink head 40 injects cyan ink. The second process color ink head 50 injects magenta ink. The third process color ink head 60 injects yellow ink. The fourth process color ink head 70 injects black ink. The number of the process color ink heads is not limited to four. There is no limitation on the color tone of the process color ink.

As shown in FIG. 2, the first process color ink head 40 includes a plurality of nozzles 41 arrayed in the feeding direction X. In the first process color ink head 40 in this preferred embodiment, the plurality of nozzles 41 are arrayed in one line to define a nozzle array 42. There is no limitation on the positional arrangement of the nozzles 41. The nozzles array 42 includes a first process color upstream nozzle array 42a located on the upstream side X1 in the feeding direction X, and a first process color downstream nozzle array 42b located on the downstream side X2 in the feeding direction X. In this preferred embodiment, the number of the nozzles 41 in the first process color upstream nozzle array 42a and the number of the nozzles 41 in the first process color downstream nozzle array 42b are equal to each other. The number of the nozzles 41 in the first process color upstream nozzle array 42a and the number of the nozzles 41 in the first process color downstream nozzle array 42b do not need to be equal to each other.

The second process color ink head 50 through the fourth process color ink head 70 each have the same structure as that of the first process color ink head 40. Specifically, the second process color ink head 50 includes a plurality of nozzles 51 arrayed in the feeding direction X, and the nozzles 51 define a nozzle array 52. The nozzle array 52 includes a second process color upstream nozzle array 52a located on the upstream side X1 in the feeding direction X, and a second process color downstream nozzle array 52b located on the downstream side X2 in the feeding direction X. The third process color ink head 60 includes a plurality of nozzles 61 arrayed in the feeding direction X, and the nozzles 61 define a nozzle array 62. The nozzle array 62 includes a third process color upstream nozzle array 62a located on the upstream side X1 in the feeding direction X, and a third process color downstream nozzle array 62b located on the downstream side X2 in the feeding direction X. The fourth process color ink head 70 includes a plurality of nozzles 71 arrayed in the feeding direction X, and the nozzles 71 define a nozzle array 72. The nozzle array 72 includes a fourth process color upstream nozzle array 72a located on the upstream side X1 in the feeding direction X, and a fourth process color downstream nozzle array 72b located on the downstream side X2 in the feeding direction X. The nozzles in the first process color ink head 40 through the fourth process color ink head 70 and the nozzles in the special color ink head 80 are located at positions matched, in the feeding direction X, to each other. In each of the first process color ink head 40 through the fourth process color ink head 70, the number of the nozzles in the upstream nozzle array and the number of the nozzles in the downstream nozzle array are equal to each other.

In FIG. 2, the first process color ink head 40 through the fourth process color ink head 70 and the special color ink head 80 are each shown as including 10 nozzles. In actuality, the first process color ink head 40 through the fourth process color ink head 70 and the special color ink head 80 each include a larger number of (e.g., 300) nozzles. There is no limitation on the number of the nozzles.

The first process color ink head 40 through the fourth process color ink head 70 and the special color ink head 80 each include actuators (not shown), each including a piezoelectric element and the like, provided therein. The actuators are electrically connected with the controller 100. The actuators are controlled by the controller 100. The actuators are driven, and as a result, the ink is injected toward the recording medium 5 from the nozzles of the ink heads 40 through 80.

The first process color ink head 40 through the fourth process color ink head 70 and the special color ink head 80 are each in communication with an ink cartridge (not shown) via an ink supply path (not shown). The ink cartridge is detachably located at, for example, a right end of the printer main body 10a. There is no limitation on the material of the ink, and any of various materials conventionally used as an ink material for an inkjet printer is usable. The ink may be, for example, solvent-based pigment ink or aqueous pigment ink. Alternatively, the ink may be aqueous dye ink, ultraviolet-curable pigment ink cured upon receipt of ultraviolet rays, or the like.

As shown in FIG. 1, the printer 10 includes a heater 35. The heater 35 is provided below the platen 12. The heater 35 is located to the front of the grit rollers 32. The heater 35 heats the platen 12. The platen 12 is heated, so that the recording medium 5 placed on the platen 12 and the ink that has landed on the recording medium 5 are heated. Thus, the drying of the ink is promoted. The heater 35 is electrically connected with the controller 100. The temperature to which the heater 35 is heated is controlled by the controller 100.

Figure 3:
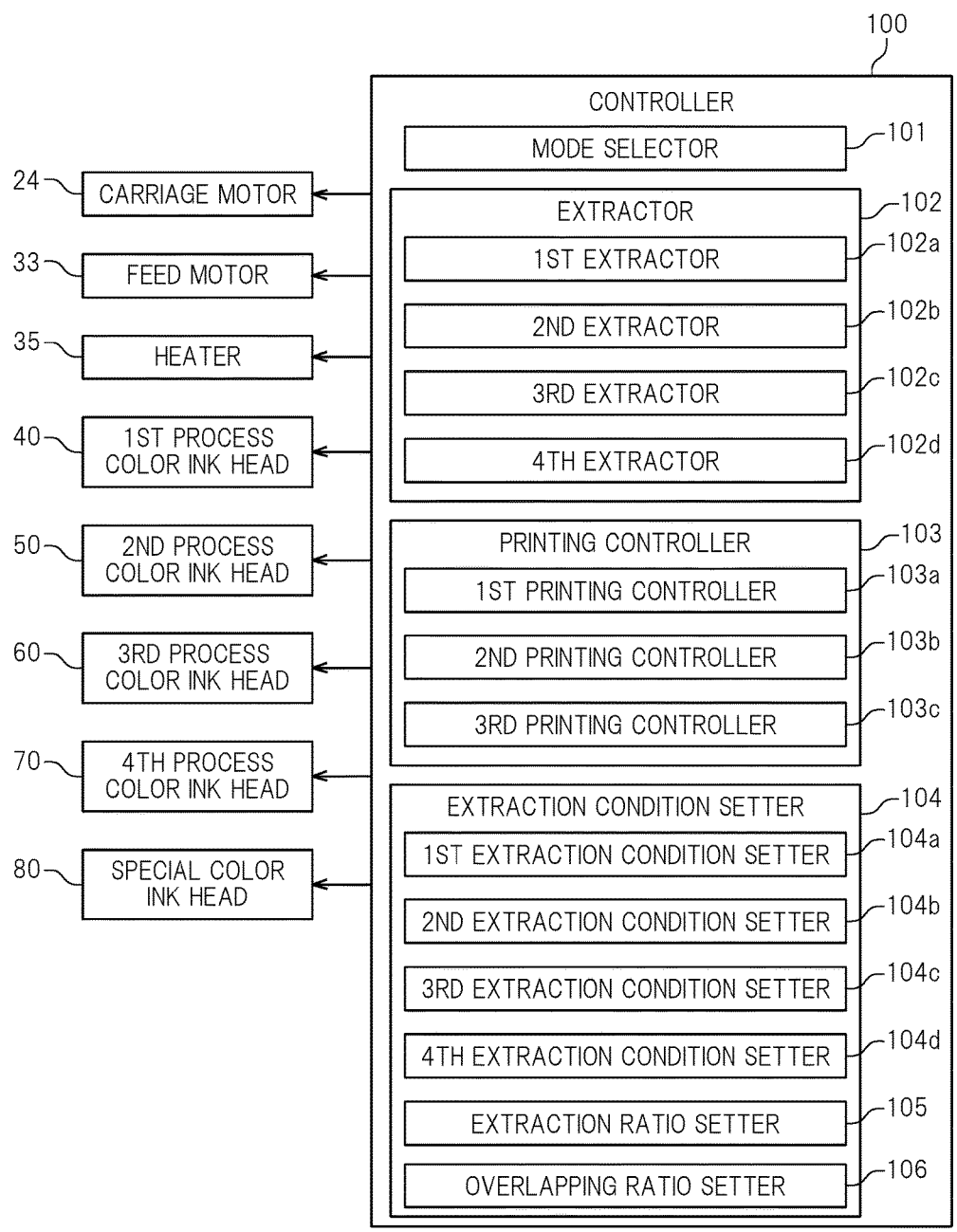
FIG. 3 is a block diagram of the printer.

As shown in FIG. 1, an operation panel 110 is provided at the right end of the printer main body 10a. The operation panel 110 includes a display that displays a state of the printer 10, input keys operable by the user, and the like. The controller 100 controlling various operations of the printer 10 is accommodated in the operation panel 110. FIG. 3 is a block diagram of the printer 10 in this preferred embodiment. As shown in FIG. 3, the controller 100 is communicably connected with, and is configured or programmed to control, the feed motor 33, the carriage motor 24, the heater 35, the first process color ink head 40, the second process color ink head 50, the third process color ink head 60, the fourth process color ink head 70 and the special color ink head 80. The controller 100 preferably is configured or programmed to include a mode selector 101, an extractor 102, a printing controller 103, and an extraction condition setter 104.

There is no specific limitation on the structure of the controller 100. The controller 100 is, for example, a microcomputer. There is no specific limitation on the hardware structure of the microcomputer. The microcomputer includes, for example, an interface (I/F) to receive printing data or the like from an external device such as a host computer or the like, a central processing unit (CPU) to execute a command of a control program, a ROM (read only memory) having, stored thereon, the program executable by the CPU, a RAM (random access memory) usable as a working area in which the program is developed, and a storage device such as a memory or the like storing the above-described program and various types of data. The controller 100 does not need to be provided inside the printer main body 10a. The controller 100 may be, for example, a computer that is located outside of the printer main body 10a and is communicably connected with the printer main body 10a in a wired or wireless manner.

The mode selector 101 is to select a printing mode. In this preferred embodiment, the printing mode is classified into "normal printing" and "piled-up printing". The "piled-up printing" is classified into "first piled-up printing" and "second piled-up printing". According to the "first piled-up printing", an underlying color of the special color ink and an underlying image of the process color ink are printed to form a lower layer, and a subject image of the process color ink is printed to form an upper layer. According to the "second piled-up printing", the subject image of the process color ink is printed to form a lower layer, and the underlying color and the underlying image are printed to form an upper layer. In the "piled-up printing" in this preferred embodiment, two layers are printed in a piled-up manner. The "first piled-up printing" and the "second piled-up printing" will be described in detail below. The printing mode may be incorporated in advance into the printing data and automatically selected. Alternatively, the printing mode may be selected appropriately by an operator.

The extractor 102 extracts a plurality of "underlying layer dot groups" from ink dots of the plurality of colors of process color ink. The "underlying layer dot groups" are formed of ink dots to form an underlying image, and are each formed of a portion of the ink dots of the corresponding color of process color ink. The extractor 102 includes a first extractor 102a, a second extractor 102b, a third extractor 102c and a fourth extractor 102d. The first extractor 102a extracts a "first underlying layer dot group" from the ink dots of the process color ink injected from the first process color ink head 40 (in this preferred embodiment, cyan ink). The "first underlying layer dot group" is extracted based on a first extraction condition set by a first setter 104a included in the extraction condition setter 104. Similarly, the second extractor 102b extracts a "second underlying layer dot group" from the ink dots of the process color ink injected from the second process color ink head 50 (in this preferred embodiment, magenta ink). The "second underlying layer dot group" is extracted based on a second extraction condition set by a second setter 104b included in the extraction condition setter 104. The third extractor 102c extracts a "third underlying layer dot group" from the ink dots of the process color ink injected from the third process color ink head 60 (in this preferred embodiment, yellow ink). The "third underlying layer dot group" is extracted based on a third extraction condition set by a third setter 104c included in the extraction condition setter 104. The fourth extractor 102d extracts a "fourth underlying layer dot group" from the ink dots of the process color ink injected from the fourth process color ink head 70 (in this preferred embodiment, black ink). The "fourth underlying layer dot group" is extracted based on a fourth extraction condition set by a fourth setter 104d included in the extraction condition setter 104. A method to extract each of the "underlying layer dot groups" will be described in detail below. Hereinafter, an image according to printing data that is created as an image to be printed with the process color ink may be referred to as an "original image". Herein, the "first underlying layer dot group" refers to the first dot group for the underlying layer, and this is applicable to the other underlying layer dot groups.

The printing controller 103 controls the printing operation. The printing controller 103 controls the carriage motor 24, the feed motor 33, and the ink heads 40 through 80 to perform printing. The printing controller 103 controls the temperature of the heater 35 to promote the drying of the ink after the injection. The printing controller 103 preferably is configured or programmed to include a first controller 103a, a second controller 103b, and a third controller 103c.

In the printing controller 103, the first printing controller 103a controls a concurrent printing operation of the underlying color and the underlying image. Hereinafter, a printing layer formed by the above-described concurrent printing operation may be referred to as a "first printing layer". The "first printing layer" is formed of the ink dots of the special color ink and the ink dots extracted to form the "underlying layer dot groups" among the ink dots of the plurality of colors of process color ink. The first printing controller 103a controls the carriage motor 24, the feed motor 33, and the ink heads 40 through 80 to perform the concurrent printing operation of the special color ink and the "underlying layer dot groups". The first printing controller 103a controls the carriage motor 24, the feed motor 33, and the ink heads 40 through 80 in a different manner in accordance with which of the "first piled-up printing" and the "second piled-up printing" is selected by the mode selector 101. More specifically, when the "first piled-up printing" is selected by the mode selector 101, the first printing controller 103a controls the components such that the "first printing layer" is formed as the lower layer. By contrast, when the "second piled-up printing" is selected by the mode selector 101, the first printing controller 103a controls the components such that the "first printing layer" is formed as the upper layer. The details of the control will be described below.

In the printing controller 103, the second printing controller 103b controls a printing work of the subject image. Hereinafter, a printing layer formed by such printing may be referred to as a "second printing layer". In this preferred embodiment, the "second printing layer" is formed of the entirety of the ink dots of the plurality of colors of process color ink. More specifically, in this preferred embodiment, where the entirety of the ink dots of the plurality of colors of process color ink is 100%, the "second printing layer" is formed of 100% of the ink dots. In other words, the subject image in this preferred embodiment is the same as the original image according to the printing data. Hereinafter, the ink dots forming the subject image will be collectively referred to as an "image dot group". The "image dot group" includes a first image dot group, a second image dot group, a third image dot group, and a fourth image dot group. The "first image dot group" is formed of the ink dots of the ink injected from the first process color ink head 40 (cyan ink). This is applicable to the second through fourth image dot groups. The "image dot group" of the four colors of process color ink is printed by the second printing controller 103b to form the "second printing layer" above or below the "first printing layer". When the "first piled-up printing" is selected by the mode selector 101, the "second printing layer" is formed above the "first printing layer". By contrast, when the "second piled-up printing" is selected by the mode selector 101, the "second printing layer" is formed below the "first printing layer" before the "first printing layer" is formed. The second printing controller 103b controls the carriage motor 24, the feed motor 33, and the process color ink heads 40 through 70 to print the subject image with the "first through fourth image dot groups" of the plurality of colors of process color ink. The details of the control will be described below.

When the "normal printing" is selected by the mode selector 101, the third printing controller 103c controls the carriage motor 24, the feed motor 33, and the process color ink heads 40 through 70 to perform the "normal printing" on the recording medium 5. A process of the "normal printing" will be described below.

The extraction condition setter 104 is to set the extraction condition for each of the "underlying layer dot groups". The extraction condition setter 104 is to set the first extraction condition to extract the "first underlying layer dot group", the second extraction condition to extract the "second underlying layer dot group", the third extraction condition to extract the "third underlying layer dot group", and the fourth extraction condition to extract the "fourth underlying layer dot group". The extraction condition setter 104 includes the first setter 104a, the second setter 104b, the third setter 104c, the fourth setter 104d, an extraction ratio setter 105, and an overlapping ratio setter 106. The first setter 104a is to set the first extraction condition. The second setter 104b is to set the second extraction condition. The third setter 104c is to set the third extraction condition. The fourth setter 104d is to set the fourth extraction condition. The first through fourth extraction conditions are each defined by the "extraction ratio" and the "overlapping ratio" of the corresponding "underlying layer dot group".

The "extraction ratio" is a ratio of each "underlying layer dot group" with respect to the entirety of the ink dots of the corresponding color of process color ink. The extraction ratio is set by the extraction ratio setter 105. In this preferred embodiment, the extraction ratio is common to all the colors of process color ink. The extraction ratio is thus set in order to allow the underlying image to have the same color balance as that of the "original image". The extraction ratio of the "underlying layer dot group" is made common to all the colors of process color ink, so that the underlying image has the same color balance as that of the "original image". The "overlapping ratio" is a ratio of ink dots of each "underlying layer dot group" that are formed at the same positions as those of the ink dots of any other "underlying layer dot group", with respect to all the ink dots of the corresponding "underlying layer dot group". The overlapping ratio is set by the overlapping ratio setter 106. The details of the settings of the "extraction ratio" and the "overlapping ratio", and the details of the settings of the first through fourth extraction conditions based on the "extraction ratio" and the "overlapping ratio", will be described below.

According to the "normal printing", one layer is formed on the recording medium 5. For the "normal printing", only the process color ink is used. In the "normal printing", the "original image" according to the printing data is printed. The "normal printing" is performed as follows. The third printing controller 103c drives the carriage motor 24 to move the carriage 25 in the scanning direction Y. The third printing controller 103c drives the actuators to cause the process color ink heads 40 through 70 to inject the ink, so that the process color ink lands on a printing surface of the recording medium 5. In addition, the third printing controller 103c controls the feed motor 33 such that the recording medium 5 is sequentially fed forward (F) (toward the downstream side X2 in the feeding direction X). The ink on the recording medium 5 fed by the feed motor 33 is sequentially heated by the heater 35 and thus is dried. The third printing controller 103c, for example, moves the carriage 25 in the scanning direction Y once or a plurality of times by the time when the recording medium 5 is fed forward (F) once.

In the piled-up printing modes including the "first piled-up printing" mode and the "second piled-up printing" mode, the "first printing layer" and the "second printing layer" are formed on the recording medium 5 in a piled-up manner. Before performing the "first piled-up printing" and the "second piled-up printing", the printing mode is set. A printing mode setting screen by which the printing mode may be set is displayed on, for example, the operation panel 110, a display device of a computer or the like by the mode selector 101. The printing mode setting screen provided by the mode selector 101 includes, for example, a tool allowing one printing mode to be selected from, for example, three printing modes of the "normal printing", the "first piled-up printing" and the "second piled-up printing". In the following, a printing process performed in a case where the "first piled-up printing" is selected will be described.

In this preferred embodiment, the first through fourth extraction conditions are preset, and thus no operation by the user is needed. In this preferred embodiment, an extraction condition setting screen is stored in an area usually not operable by the user. FIG. 4 shows an example of extraction condition setting screen provided by the extraction condition setter 104. As shown in FIG. 4, the extraction condition setting screen includes input boxes to which the extraction ratios (represented by Rp in FIG. 4 and the like) may be input, and display boxes displaying the "overlapping ratios" (represented by Ro in FIG. 4 and the like). The input boxes for the extraction ratios Rp form a setting tool displayed on the screen by the extraction ratio setter 105. The display boxes of the overlapping ratios Ro form a checking tool displayed on the screen by the overlapping ratio setter 106. The extraction ratios Rp and the overlapping ratios Ro are a portion of the first through fourth extraction conditions and are common to all the colors of process color ink.

In FIG. 4, the extraction ratio Rp is set to 30%. This indicates that the ink dots corresponding to 30% of all the ink dots of each color of process color ink are extracted as the ink dots forming a portion of the underlying image (namely, as the "underlying layer dot group"). As described above, the ink dots forming the subject image (i.e., the "image dot group") correspond to 100% of the ink dots of the process color ink.

The "underlying layer dot group" is extracted for each color of process color ink based on the extraction ratio Rp. Where, for example, there are 10000 ink dots of the cyan ink in the entirety of the original image, the number of the ink dots of the cyan ink belonging to the "underlying layer dot group" (more specifically, the "first underlying layer dot group") is 3000, which is 30% of the 10000 ink dots. Similarly, where, for example, there are 20000 ink dots of the magenta ink in the entirety of the original image, the number of the ink dots of the magenta ink belonging to the "underlying layer dot group" (more specifically, the "second underlying layer dot group") is 6000, which is 30% of the 20000 ink dots.

The "underlying layer dot group" of each color of process color ink is provided by, for example, extracting a portion of the ink dots, namely, leaving the remaining portion not extracted, by use of a dithering mask. The dithering mask is to extract a portion of the ink dots by a dithering method. The dithering method is one of pseudo gradation expressing algorithms. According to the dithering method, when an ink value of image data in a microscopic region of a printing region is higher than, or equal to, a defined threshold value, the ink dot in this microscopic region is turned ON. By contrast, when the ink value of the image data in this region is lower than the defined threshold value, the ink dot in this region is turned OFF. For example, according to the simplest dithering method, namely, the binary dithering method, the image data is divided into an ON region and an OFF region by one threshold value. In this case, an image provided as a result of the binary dithering performed by use of the dithering mask is a rough image having a smaller number of pixels while keeping features of the original image to a certain degree. The dithering method is not limited to the binary dithering method. The dithering method includes an ordered dithering method of using a matrix assigned threshold values, a random dithering method of setting threshold values randomly within a certain range, and the like. In this preferred embodiment, the "first underlying layer dot group" is extracted from the ink dots of the cyan ink by use of a first dithering mask (hereinafter, referred to as a "first mask"). The "second underlying layer dot group" is extracted from the ink dots of the magenta ink by use of a second dithering mask (hereinafter, referred to as a "second mask"). The "third underlying layer dot group" is extracted from the ink dots of the yellow ink by use of a third dithering mask (hereinafter, referred to as a "third mask"). The "fourth underlying layer dot group" is extracted from the ink dots of the black ink by use of a fourth dithering mask (hereinafter, referred to as a "fourth mask"). The first extraction condition to extract the "first underlying layer dot group" is a pattern of the first mask (hereinafter, may be referred to as a "first mask pattern"). Similarly, the second extraction condition to extract the "second underlying layer dot group" is a pattern of the second mask (hereinafter, may be referred to as a "second mask pattern"). The third extraction condition to extract the "third underlying layer dot group" is a pattern of the third mask (hereinafter, may be referred to as a "third mask pattern"). The fourth extraction condition to extract the "fourth underlying layer dot group" is a pattern of the fourth mask (hereinafter, may be referred to as a "fourth mask pattern"). In this preferred embodiment, the first through fourth mask patterns are different from each other. The extraction ratio set for the first through fourth mask patterns is the same. In the example shown in FIG. 4, the extraction ratio is 30%.

In this preferred embodiment, the overlapping ratio Ro is automatically set by the printer 10. More specifically, the overlapping ratio Ro is automatically set to be minimum based on the set extraction ratio Rp. In other words, the first through fourth extraction conditions (namely, the first through fourth mask patterns) are automatically set such that the overlapping ratio Ro is minimum. As described above, the overlapping ratio Ro is a ratio of ink dots of each "underlying layer dot group" that are formed at the same positions as those of the ink dots of any other "underlying layer dot group", with respect to all the ink dots of the corresponding "underlying layer dot group".

Figure 5:
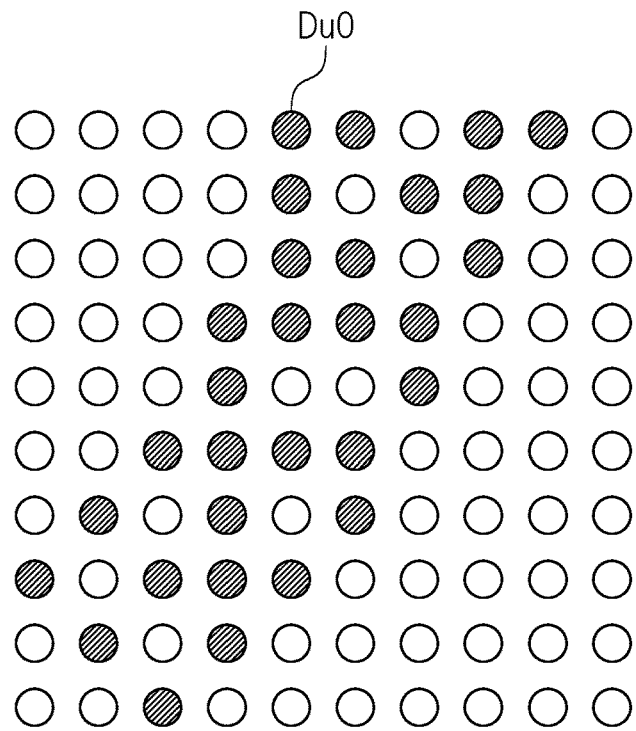
FIG. 5 shows, for comparison, underlying layer dot groups extracted by use of a single mask.

Hereinafter, a process to extract the "first underlying layer dot group" through the "fourth underlying layer dot group" from the ink dots of the process color ink by use of the printer 10 in this preferred embodiment will be described. FIG. 5 shows the "underlying layer dot groups" extracted from the ink dots of the four colors of process color ink by use of the same mask pattern. FIG. 5 shows, for comparison, a difference of the underlying dot groups" in the above-described case from the "underlying layer dot groups" extracted by the printer 10 in this preferred embodiment. The extraction ratio is 30% as shown in FIG. 4. FIG. 5 shows 100 points. The 100 points are the positions on the recording medium 5 at which the ink dots of the four colors of process color ink are formed in the "original image". Namely, the 100% points correspond to 100% of the ink dots of the four colors of process color ink. For the sake of simplicity, it is assumed that in the "original image", the ink dots of the four colors of ink, specifically, cyan ink, magenta ink, yellow ink and black ink, are printed in an overlapping manner at the points shown in FIG. 5.

As shown in FIG. 5, reference sign Du0 represent the underlying layer dot groups formed in an overlapping manner. In the example shown in FIG. 5, the underlying layer dot groups are formed at 30 points extracted by use of the dithering mask. In FIG. 5, the 30 points at which the underlying layer dot groups are formed are represented by fine-hatched circles. At these 30 points, the ink dots of the four colors of process color ink are printed in an overlapping manner. White circles represent the points not extracted as the underlying layer dot group Du0 (namely, the points to which the process color ink is not injected to print the underlying image). As shown in FIG. 5, the underlying layer dot groups appear as a graphical pattern flowing from a top right area to a bottom left area, although the graphical pattern is not so conspicuous in actuality.

As described above, the graphical pattern shown in FIG. 5 is provided by extracting the "underlying layer dot groups" of the four color of process color ink by use of a single mask. The ink dots in the "underlying layer dot groups" are a portion of the ink dots of the process color ink. Therefore, as seen on an ink dot-by-ink dot basis, there are points to which the ink has been injected and points to which the ink has not been injected. The graphical pattern shown in FIG. 5 is provided in the case where the extraction pattern of the points to which the ink has been injected and the points to which the ink was not injected is visually recognized. The extraction of ink dots by use of the dithering mask should be performed such that no artificial unnaturalness is left (when the dithering mask is used, the positions of the ink dots are expected to be dispersed to a certain degree, and thus it is not easily occur that the ink dots are extracted from any particular region). Nonetheless, there may be cases where the extracted ink dots have a certain extraction pattern, and in such a case, the extraction pattern may appear as a graphical pattern.

Figure 6:
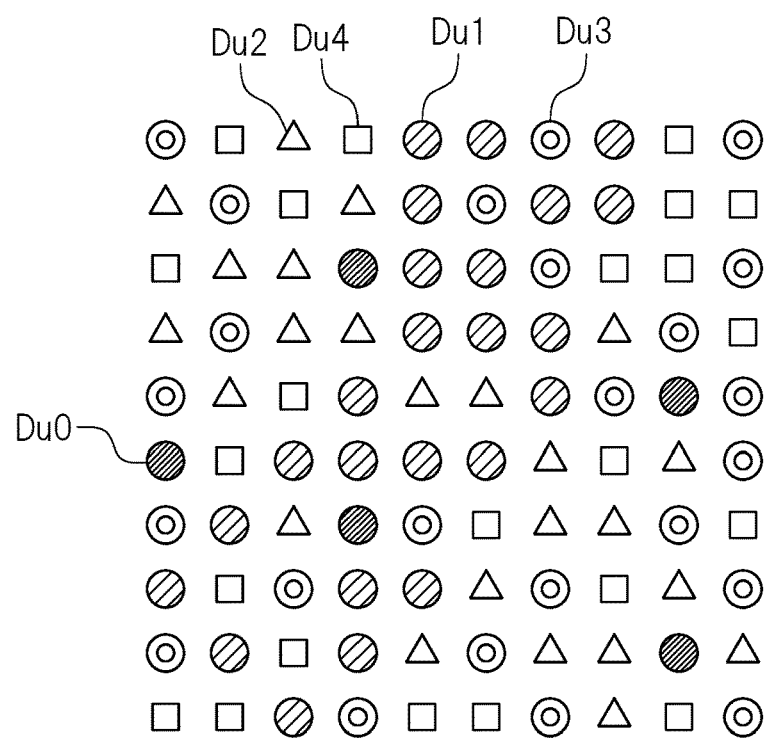
FIG. 6 shows underlying layer dot groups in preferred embodiment 1 of the present invention.

By contrast, the "underlying layer dot groups" extracted by the printer 10 in this preferred embodiment are expected not to exhibit as conspicuous an extraction pattern as shown in FIG. 5. FIG. 6 is a schematic view of the "underlying layer dot groups" extracted by the printer 10 in this preferred embodiment. The extraction ratio of the "underlying layer dot groups" shown in FIG. 6 is also 30%. In FIG. 6, reference sign Du1 represents the "first underlying layer dot group". The first underlying layer dot group Du1 is formed of the ink dots of the cyan ink. The points at which the first underlying layer dot group Du1 is formed are represented by rough-hatched circles. Reference sign Du2 represents the "second underlying layer dot group". The second underlying layer dot group Du2 is formed of the ink dots of the magenta ink. The points at which the second underlying layer dot group is formed are represented by triangles. Reference sign Du3 represents the "third underlying layer dot group". The third underlying layer dot group Du3 is formed of the ink dots of the yellow ink. The points at which the third underlying layer dot group is formed are represented by double circles. Reference sign Du4 represents the "fourth underlying layer dot group". The fourth underlying layer dot group Du4 is formed of the ink dots of the black ink. The points at which the fourth underlying layer dot group is formed are represented by squares. At the points of an underlying layer dot group Du0, the ink dots of the plurality of colors of ink are formed in an overlapping manner. Such points are represented by fine-hatched circles.

Figure 7A:
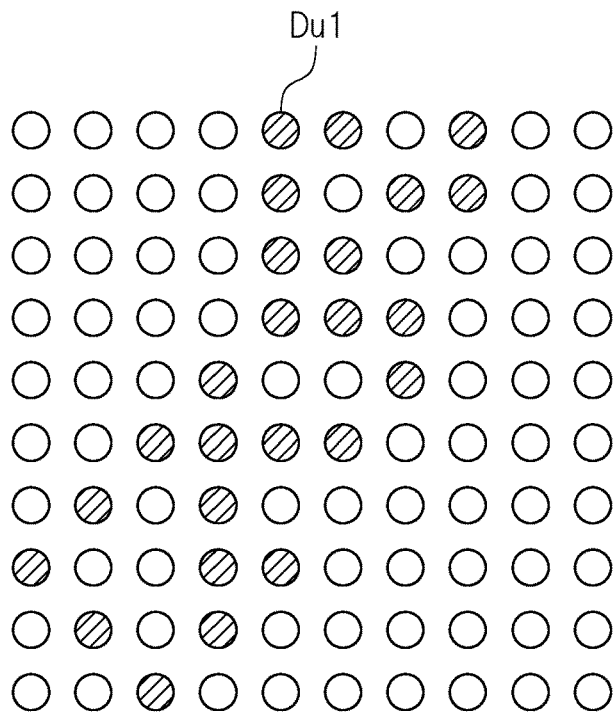
FIG. 7A shows a state at the initial time point of a process of forming the underlying layer dot groups shown in FIG. 6.
Figure 7B:
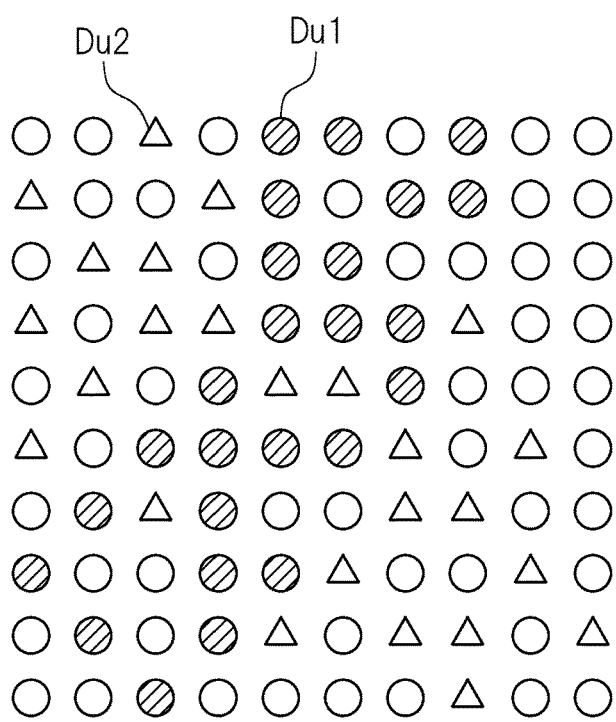
FIG. 7B shows a state at the next time point to that of FIG. 7A.
Figure 7C:
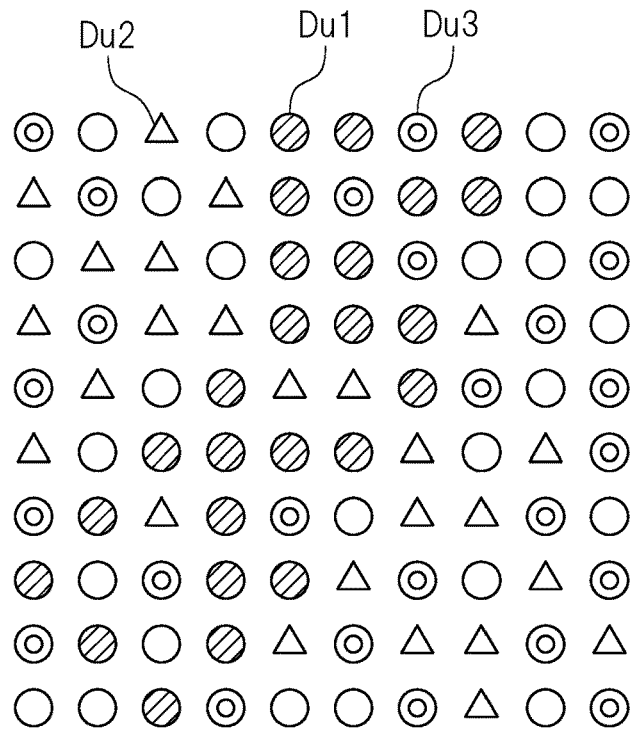
FIG. 7C shows a state at the next time point to that of FIG. 7B.
Figure 7D:
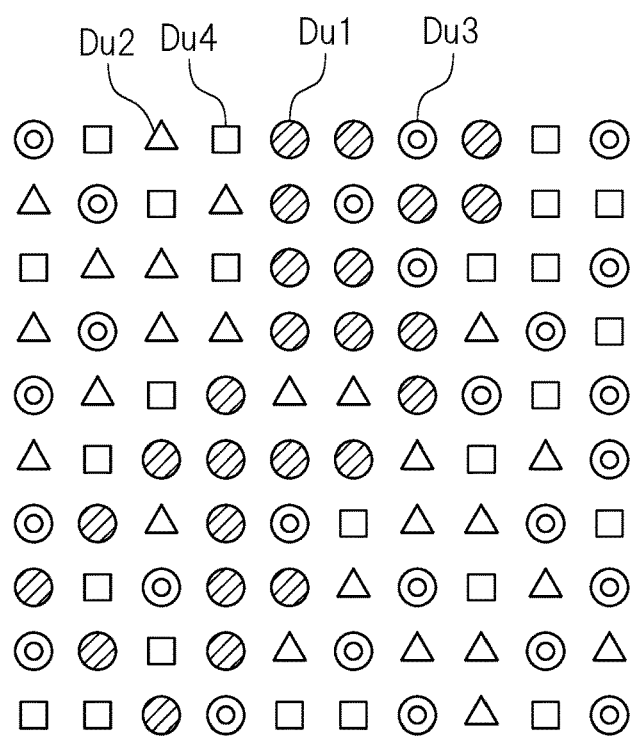
FIG. 7D shows a state at the next time point to that of FIG. 7C.

FIGS. 7A to 7D show how the positional arrangement of the "underlying layer dot groups" shown in FIG. 6 is provided. FIG. 7A shows a state at the initial time point. FIG. 7B shows a state at the next time point to that of FIG. 7A. FIG. 7C shows a state at the next time point to that of FIG. 7B. FIG. 7D shows a state at the next time point to that of FIG. 7C. FIG. 6 shows a state at the next time point to that of FIG. 7D (namely, FIG. 6 shows the finished state). At the time point shown in FIG. 7A, the first underlying layer dot group Du1 is extracted. This is an example, and the extraction may be started with another "underlying layer dot group". As shown in FIG. 7A, 25 points are extracted as the points at which the first underlying layer dot group Du1 is to be formed. A reason for this is that the 100 points are to be, first, equally divided among the four colors of cyan, magenta, yellow and black with no overlapping. As shown in FIG. 7A, the 25 ink dots of the first underlying layer dot group Du1 appear to form a graphical pattern similar to that in FIG. 5.

FIG. 7B shows the state at the next time point to that of FIG. 7A, and is a schematic view showing that the second underlying layer dot group Du2 is extracted. The points for the second underlying layer dot group Du2 are extracted from the points that are not extracted for the first underlying layer dot group Du1 of the cyan ink. 25 points are extracted as the points at which the second underlying layer dot group Du2 is to be formed, for example. As can be seen, the second mask pattern for the second underlying layer dot group Du2 extracts, with priority, the points not extracted for the first underlying layer dot group Du1. As a result of the extraction of the second underlying layer dot group, there are 25 points at which the first underlying layer dot group is to be formed and 25 points at which the second underlying layer dot group is to be formed as shown in FIG. 7B, for example. The 25 points of the second underlying layer dot group appear to form a graphical pattern flowing from a top left area to a bottom right area.

At the time points shown in FIGS. 7C and 7D, substantially the same processes are performed. At the time point shown in FIG. 7C, the third underlying layer dot group Du3 is extracted. At the time point shown in FIG. 7D, the fourth underlying layer dot group Du4 is extracted. At any of the time points, the ink dots are extracted such that the ink dots of different colors do not overlap each other. At the time point shown in FIG. 7D, all the 100 points have been extracted for either one of the "underlying layer dot groups".

The extraction ratio of each of the "underlying layer dot groups" shown in the final state shown in FIG. 6 is 30%, for example. However, the extraction ratio of each color of process color ink at the time point shown in FIG. 7D is 25%. Therefore, the remaining 5% is further extracted for each color after the state shown in FIG. 7D. Since each of the 100 points now belongs to either one of the "underlying layer dot groups", the ink dots, of a plurality of colors of process color ink, corresponding to the remaining 5% are extracted in an overlapping manner. There is no limitation on the form of overlapping. In this preferred embodiment, the ink dots, of the four colors of process color ink, corresponding to the remaining 5% are extracted in an overlapping manner. More specifically, five points are extracted as the points at which all the four colors of ink dots are to be formed in an overlapping manner. Thus, the remaining 5% is added to the above-described 25%. The five points form the underlying layer dot group Du0 of the four colors of ink dots formed in an overlapping manner. FIG. 6 shows the state after the supplement, namely, the state where the extraction of the "underlying layer dot groups" is finished.

As described above, the first through fourth extraction conditions in this preferred embodiment significantly reduce or minimize the overlapping ratio under the set extraction ratio. Namely, the first through fourth extraction conditions allow the underlying layer dot group of each color of process color ink to be extracted, such that the number of the ink dots overlapping at the same position is significantly reduced or minimized. For this purpose, the first through fourth extraction conditions are designed to be complementary to each other.

As shown in FIG. 6, the underlying layer dot groups Du1 through Du4 extracted by the printer 10 in this preferred embodiment do not cause a viewer to recognize any graphical pattern, unlike the underlying layer dot groups shown in FIG. 5. In actual printing, the underlying image is printed on the printing surface, and a graphical pattern may appear in the underlying image. Nonetheless, the principle is the same. The ink dots of different colors of process color ink that are extracted as the "underlying layer dot groups" are prevented from overlapping as much as possible, so that the underlying layer dot groups are prevented from having any particular extraction pattern. Thus, appearance of any graphical pattern in the underlying image is significantly reduced or prevented.

As described above, the printer 10 in this preferred embodiment allows the mask pattern to be set independently for each color of process color ink. Even if any graphical pattern is exhibited by the mask pattern for one color, another mask pattern may be set for another color. In this manner, the appearance of a graphical pattern is able to be significantly reduced or prevented in the entirety of the image. The graphical pattern exhibited by a mask pattern for each single color is pale. Therefore, in the state where different graphical patterns overlap each other, such graphical patterns are made inconspicuous in the entirety of the image.

In the above-described case, five out of 30 ink dots of each color of process color ink overlap, for example. Therefore, the overlapping ratio Ro is about 17% (see FIG. 4), for example. Namely, in this preferred embodiment, in the case where there are four colors of process color ink and the extraction ratio Rp is 30%, the overlapping ratio Ro is uniformly determined to be about 17%, for example. In the case where, for example, there are four colors of process color ink and the extraction ratio is set to 20%, the sum of the "underlying layer dot groups" of the four colors is 80%, for example. Therefore, the overlapping ratio Ro is 0%.

Hereinafter, a printing process performed by the printer 10 in this preferred embodiment after the positions at which the "underlying layer dot groups" are formed are determined will be briefly described. In the following, a case where the "first piled-up printing" is selected and the extraction ratio is set to 30% will be described. In the "first piled-up printing", the underlying color and the underlying image are printed to form the lower layer, whereas the subject image is printed to form the upper layer.

FIG. 8 shows how the ink is injected from each of the nozzles in the "first piled-up printing". In FIG. 8, the nozzles through which the process color ink forming the first underlying layer dot group Du1 is injected are represented by hatched circles. The nozzles through which the process color ink forming the second underlying layer dot group Du2 is injected are represented by triangles. The nozzles through which the process color ink forming the third underlying layer dot group Du3 is injected are represented by double circles. The nozzles through which the process color ink forming the fourth underlying layer dot group Du4 is injected are represented by squares. The nozzles through which the special color ink (represented by Ds in FIG. 8) is injected are represented by crosses. The nozzles through which the process color ink forming the image dot group (represented by Do in FIG. 8) is injected are represented by inverted triangles.

As shown in FIG. 8, the special color ink Ds is injected from the nozzles 81 of the special color upstream nozzle array 82a, among the nozzles 81 of the special color ink head 80. The ink forming the first underlying layer dot group Du1 is injected from the nozzles 41 of the first process color upstream nozzle array 42a, among the nozzles 41 of the first process color ink head 40. This is applicable to the other process color ink head 50 through 70. The ink forming the second underlying layer dot group Du2 is injected from the nozzles 51 of the second process color upstream nozzle array 52a, among the nozzles 51 of the second process color ink head 50. The ink forming the third underlying layer dot group Du3 is injected from the nozzles 61 of the third process color upstream nozzle array 62a, among the nozzles 61 of the third process color ink head 60. The ink forming the fourth underlying layer dot group Du4 is injected from the nozzles 71 of the fourth process color upstream nozzle array 72a, among the nozzles 71 of the fourth process color ink head 70. Namely, the special color ink and the process color ink forming each of the "underlying layer dot groups" are injected from the nozzles of the upstream nozzle arrays. The amount of the ink injected to form each of the "underlying layer dot groups" is 30% with respect to the amount of the corresponding color of ink in the "original image".

The ink forming the first image dot group is injected from the nozzles 41 of the first process color downstream nozzle array 42b, among the nozzles 41 of the first process color ink head 40. Similarly, the ink forming the second through fourth image dot groups is injected from the nozzles of the downstream nozzle arrays of the second process color ink head 50 through the fourth process color ink head 70. Namely, the process color ink forming the "image dot group" is injected from the nozzles of the downstream nozzle arrays of the process color ink heads 40 through 70. The amount of the process color ink injected to form the "image dot group" occupies 100% of the amount of the ink in the original image.

The upstream nozzle arrays of the ink heads are located on the upstream side X1 in the feeding direction X with respect to the downstream nozzle arrays. The recording medium 5 is fed from the rear side Rr toward the front side F (from the upstream side X1 toward the downstream side X2 in the feeding direction X). Therefore, the upstream nozzle arrays are always used for printing before the downstream nozzle arrays. For this reason, the ink injected from the upstream nozzle arrays forms a printing layer below the ink injected from the downstream nozzle arrays. In the "first piled-up printing", the printer 10 in this preferred embodiment repeats the printing shown in FIG. 8 intermittently. In this manner, the printer 10 in this preferred embodiment is able to perform the "first piled-up printing" without feeding back the recording medium 5 toward the upstream side X1 in the feeding direction X.

In the case where the "second piled-up printing" is selected, the upstream nozzle arrays and the downstream nozzle arrays have opposite roles to those of the "first piled-up printing". More specifically, the process color ink forming the image dot group Do is injected from the nozzles of the upstream nozzle arrays of the process color ink heads 40 through 70. The special color ink Ds is injected from the nozzles 81 of the special color downstream nozzle array 82b. The process color ink forming the underlying layer dot groups Du1 through Du4 is injected from the nozzles of the downstream nozzle arrays of the process color ink heads 40 through 70. In this manner, the printer 10 in this preferred embodiment is able to perform printing both in the "first piled-up printing" and the "second piled-up printing" without feeding back the recording medium 5 toward the upstream side X1 in the feeding direction X.

Preferred Embodiment 2

In preferred embodiment 2, the overlapping ratio of the "underlying layer dot groups" is settable. In preferred embodiment 1, the overlapping ratio of the "underlying layer dot groups" is automatically set to a minimum possible value based on the extraction ratio. However, the "minimum" overlapping ratio is not necessarily suitable or optimal for all the images. For example, the printer 10 in this preferred embodiment may print the underlying image having a color balance partially different from that of the original image in order to disperse, to a maximum possible degree, the positions of the "underlying layer dot groups" of the plurality of colors of process color ink. In preferred embodiment 2, the overlapping ratio of the "underlying layer dot groups" is made settable in order to realize such an underlying image. The printer in preferred embodiment 2 is the same as the printer in preferred embodiment 1 except for the above-described point. In the following description of preferred embodiment 2, the components same as those of preferred embodiment 1 will bear the same reference signs, and overlapping descriptions will be omitted or simplified.

Figures 9, 10:
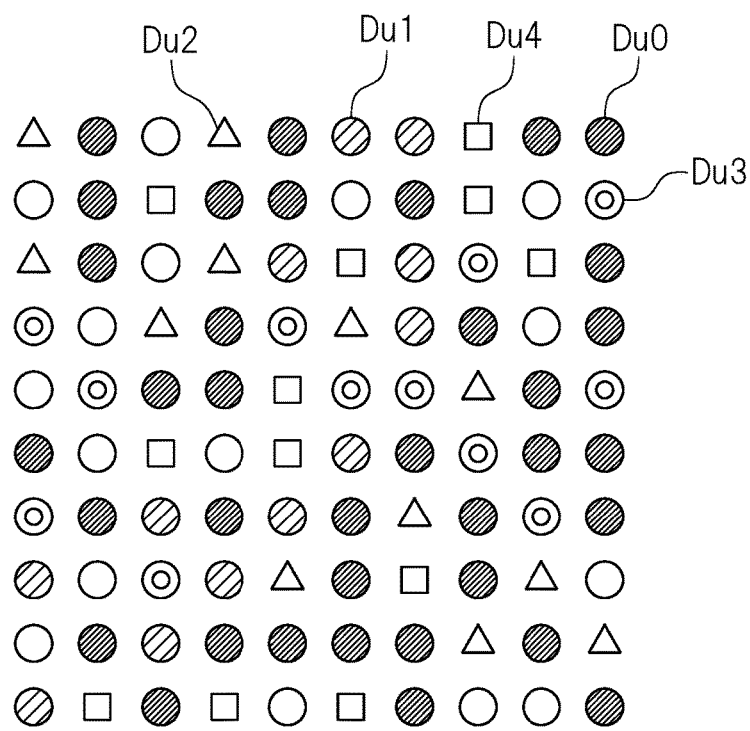
FIG. 9 shows an example of extraction condition setting screen in preferred embodiment 2 of the present invention.
FIG. 10 shows underlying layer dot groups in preferred embodiment 2 of the present invention.

FIG. 9 shows an extraction condition setting screen in this preferred embodiment. In this preferred embodiment, the extraction condition setting screen is stored in an area usually not operable by the user, like in preferred embodiment 1. The extraction condition setting screen shown in FIG. 9 allows the extraction ratio Rp and also the overlapping ratio Ro to be set.

In the extraction condition setting screen shown in FIG. 9, the overlapping ratio Ro is input to an overlapping ratio input box after the extraction ratio Rp is set. The overlapping ratio Ro that may be input is of the minimum possible value calculated from the extraction ratio Rp or of a higher value. In the example shown in FIG. 9 also, the extraction ratio is 30%, for example. Therefore, the minimum possible ratio is 17%, for example, as described above in preferred embodiment 1. In this preferred embodiment, the value in the overlapping ratio input box may be changed to any value that is the minimum possible value (in this example, 17%) or greater and 100% or less. In the case where the overlapping ratio Ro is set to 100%, the ink dots are extracted by use of a single mask as shown in FIG. 5. In the example of FIG. 9, the overlapping ratio Ro is set to 60%.

The above-described case will be described by way of an example in which each of 100 points is extracted for either one of the four colors of process color ink, like in preferred embodiment 1. First, for each color of process color ink, the "underlying layer dot group" corresponding to 40%, which does not overlap the "underlying layer dot group" of any other color of process color ink, is extracted. The number of the ink dots corresponding to 40% is 12 (extraction ratio 30%×non-overlapping ratio 40%=12%). 48 points, as the sum of the 12 points of the four colors, are extracted as the points at which the "underlying layer dot groups" are to be formed. Among the remaining 52 points, 18 points (extraction ratio 30%×overlapping ratio 60%=18%) are extracted as the points at which the "first underlying layer dot group" through the "fourth underlying layer dot group" are to be formed in an overlapping manner.

In the above-described extraction process, the "non-overlapping points" may be extracted by another method. For example, the 18 ink dots of each color of process color ink that overlap the "underlying layer dot groups" of the other colors of process color ink may be equally divided to three, and the resultant six ink dots of each color of process color ink may overlap one of the other three colors of process color ink. There are six ways of combining two colors out of the four colors. Therefore, 6×6=36 points are extracted. In this case, 84 points in total are extracted as the points at which the "underlying layer dot groups" are to be formed. FIG. 10 shows the final state of the "underlying layer dot groups" extracted by the above-described process. The reference signs and symbols in FIG. 10 are the same as those in FIG. 6. It should be noted that at the points of the underlying layer dot group Du0 shown in FIG. 10, two colors of ink dots, out of the four colors of process color ink, overlap each other. The "underlying layer dot groups" shown in FIG. 10 do not cause a viewer to recognize any graphical pattern, unlike the underlying layer dot groups shown in FIG. 5.

As described above, the printer 10 in this preferred embodiment may adjust the overlapping ratio Ro of the "underlying layer dot groups" and thus may set a preferred mask pattern. The preferred mask pattern of each color of process color ink may vary on an image-by-image basis. Therefore, the adjustment on the overlapping ratio Ro of the "underlying layer dot groups" is effective.

In this preferred embodiment, the overlapping ratio Ro is arbitrarily adjustable within a predetermined range. It is preferred that the overlapping ratio Ro is set in comprehensive consideration of, for example, a change in the granularity caused by the mask pattern of each color of process color ink.

Modifications

Preferred embodiment 1 and preferred embodiment 2 may be carried out in any of various preferred modifications. According to one such preferred modification, the printer 10 includes a plurality of the extraction condition setters 104. In this preferred modification, one extraction condition setter 104 acts to set one image quality type. The printer 10 may select a desired image quality type from a plurality of image quality types prepared in advance.

For example, for the plurality of image quality types, different extraction ratios may be set. In the case where an image quality type for which a high extraction ratio is set is selected, the underlying image is printed to be dark, and the image in a finished state is expected to have a sharp appearance. By contrast, in the case where an image quality type for which a low extraction ratio (or an extraction ratio of 0%) is set is selected, the underlying image is printed to be pale (or is not printed), and the image in a finished state is expected to have a soft appearance.

Alternatively, for the plurality of image quality types, different overlapping ratios may be set. The preferred overlapping ratio may vary in accordance with the "original image". Therefore, in this preferred modification, a plurality of image quality types for which different overlapping ratios are set are prepared. A plurality of image quality types for which different extraction ratios and different overlapping ratios are set may be prepared. The image quality types thus prepared may be assigned names representing features the image quality types such as, for example, "sharp", "soft" and the like.

Some preferred embodiments of the present invention have been described. The above-described preferred embodiments are mere examples, and the technology disclosed herein may be carried out in any of various forms.

For example, in the above-described preferred embodiments, the "image dot group" is formed of 100% of the ink dots of the process color ink. Namely, the subject image is the same as the "original image". Alternatively, the subject image does not need to be the same as the "original image". The subject image may be a portion of the "original image". It is sufficient that the sum of the ink dots of the underlying image and the ink dots of the subject image include all the ink dots of the "original image". In other words, it is sufficient that the "image dot group" includes at least the ink dots, of the process color ink, other than the ink dots forming the "underlying layer dot groups". Ink dots may be included in both of the "image dot group" and the "underlying layer dot groups".

In the above-described preferred embodiments, the overlapping ratio of the "underlying layer dot groups" is adjusted, so that a graphical pattern does not appear. The technology disclosed herein is not limited to this. For example, different mask patterns may be set for different masks. For example, one ordered dithering mask may be set for one mask pattern, whereas another ordered dithering mask may be set for another mask pattern. It is considered that in the case where the masks for different colors have different mask patterns, different graphical patterns appear for the different colors. As a result, the graphical patterns cancel each other so as not to be visually recognized in the entirety of the image. Different masks do not need to be provided for all the colors of process color ink. For example, the same mask may be used for a first color of process color ink and a second color of process color ink. It is sufficient that the mask patterns for the plurality of colors of process color ink are settable independently. If one mask pattern is preferred, such a mask pattern may be set for all the colors of process color ink.

In the above-described preferred embodiments, the extraction ratio of the "underlying layer dot group" is common to all the colors of process color ink. Alternatively, the extraction ratio may be set independently for each color of process color ink. Namely, the extraction ratios may be set such that an image having a color balance different from that of the "original image" may be provided. In such a case, even if the printed image does not have a desired color balance due to the influence of the underlying color of the special color ink, the color balance may be adjusted.

In the above-described preferred embodiments, the extraction conditions for the "underlying layer dot groups" are preset, and the user is merely allowed to select one of the extraction conditions. Alternatively, the user may set the extraction conditions. The technology disclosed herein does not eliminate such a preferred embodiment.

In the preferred embodiments, the printing is performed by so-called single pass printing. According to the single pass printing, printing of one printing region is finished by one time of scanning. In the piled-up printing, there is such a printing region for each of the "first printing layer" and the "second printing layer". Alternatively, the technology disclosed herein may be carried out by so-called multi-pass printing. According to the multi-pass printing, printing of one printing region is finished by a plurality of times of scanning.

According to the "piled-up printing" in the above-described preferred embodiments, two layers, namely, a lower layer and an upper layer, are formed in a piled-up state. Alternatively, three or more layers may be formed in a piled-up state. For example, three layers of an underlying color layer, an image layer and a top coat may be formed in a piled-up state. In this case, the top coat may be formed of, for example, transparent ink. In the case where three or more layers are formed in a piled-up state, another dot group may be generated of the ink dots of each color of the process color ink, not only the "underlying layer dot group" and the "image dot group".

In the above-described preferred embodiments, the ink heads 40 through 80 in the carriage 25 are located side by side in the scanning direction Y. Alternatively, the ink heads may be located in a different positional arrangement. For example, the process color ink heads and the special color ink head may be located as being offset in the feeding direction X. In the case where the process color ink heads and the special color ink head are located as being completely offset in the feeding direction X, the nozzle array in each ink head are not divided into the upstream nozzle array and the downstream nozzle array. In this case, all the nozzles in the ink head are usable. In the case where the process color ink heads and the special color ink head are located as being partially offset in the feeding direction X, the number of the usable nozzles are smaller than in the case where the ink heads are located as being completely offset, but the carriage 25 may be made compact. In addition, the process color ink heads and the special color ink head may be mounted on, and may be movable by, different carriages. Still alternatively, the printing of the "first printing layer" and the printing of the "second printing layer" may be performed in completely different steps.

In the above-described preferred embodiments, the plurality of colors of ink are injected from different ink heads. The technology disclosed herein is not limited to this. One ink head may include a plurality of nozzle arrays, and a plurality of colors of ink may be injected from such one ink head. The "recording head" in the technology disclosed herein encompasses such a form.

In the above-described preferred embodiments, the ink is injected by a so-called piezo-driving system of changing the volume of the pressure chamber by the displacement of the piezoelectric element. Alternatively, the printer in a preferred embodiment of the present invention may adopt, for example, any of continuous systems including such as a binary deflection system, a continuous deflection system and the like, or any of on-demand systems including a thermal system and the like. There is no limitation on the ink injection system according to a preferred embodiment of the present invention.

In the above-described preferred embodiments, the carriage 25 moves in the scanning direction Y whereas the recording medium 5 moves in the feeding direction X. The printer in a preferred embodiment of the present invention is not limited to such a system. The movement of the carriage 25 and the recording medium 5 are relative, and either one of the carriage 25 and the recording medium 5 may be moved in the scanning direction Y or the feeding direction X. For example, the recording medium 5 may be unmovable whereas the carriage 25 may be movable in both of the scanning direction Y and the feeding direction X. Alternatively, both of the carriage 25 and the recording medium 5 may be movable in both of the directions.

The technology disclosed herein is applicable to any of various types of inkjet printer. The technology disclosed herein is applicable to a so-called roll-to-roll printer of feeding the roll-type recording medium 5 described in the above-described preferred embodiment, or to a flat bed inkjet printer, for example. The printer 10 is not limited to a printer that is independently usable, and may be a printer combinable with another device. For example, the printer 10 may be incorporated into another device.

The terms and expressions used herein are for description only and are not to be interpreted in a limited sense. These terms and expressions should be recognized as not excluding any equivalents to the elements shown and described herein and as allowing any modification encompassed in the scope of the claims. The present invention may be embodied in many various forms. This disclosure should be regarded as providing preferred embodiments of the principle of the present invention. These preferred embodiments are provided with the understanding that they are not intended to limit the present invention to the preferred embodiments described in the specification and/or shown in the drawings. The present invention is not limited to the preferred embodiments described herein. The present invention encompasses any of preferred embodiments including equivalent elements, modifications, deletions, combinations, improvements and/or alterations which can be recognized by a person of ordinary skill in the art based on the disclosure. The elements of each claim should be interpreted broadly based on the terms used in the claim, and should not be limited to any of the preferred embodiments described in this specification or used during the prosecution of the present application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An inkjet printer, comprising:
a recording head including:
    a first color ink head including a plurality of nozzles through which a first ink of a first color is injected toward a recording medium to form ink dots of the first ink of the first color on the recording medium;
    a second color ink head including a plurality of nozzles through which a first ink of a second color is injected toward the recording medium to form ink dots of the first ink of the second color on the recording medium; and
    a second ink ink head including a plurality of nozzles through which a second ink is injected toward the recording medium to form ink dots of the second ink on the recording medium;
a moving mechanism to move the recording head and the recording medium with respect to each other; and
a controller connected with the recording head and the moving mechanism to control the recording head and the moving mechanism; wherein
the controller is configured or programmed to include:
    a first setter to set a first extraction condition to extract a portion of, or an entirety of, the ink dots of the first ink of the first color;
    a second setter to set a second extraction condition to extract a portion of, or an entirety of, the ink dots of the first ink of the second color, the second extraction condition being different from the first extraction condition;
    a first extractor to extract a first underlying layer dot group from the ink dots of the first ink of the first color based on the first extraction condition;
    a second extractor to extract a second underlying layer dot group from the ink dots of the first ink of the second color based on the second extraction condition;
    a first printing controller configured or programmed to form a first printing layer, on the recording medium, of at least the first underlying layer dot group, the second underlying layer dot group and the ink dots of the second ink; and
    at least one additional printing controller each forming one additional printing layer, above or below the first printing layer, of an image dot group including at least the ink dots, of the first ink of the first color, other than the first underlying layer dot group and including the ink dots, of the first ink of the second color, other than the second underlying layer dot group;
the first extraction condition includes a first mask pattern; and
the second extraction condition includes a second mask pattern different from the first mask pattern.

2. The inkjet printer according to claim 1, wherein:
the first ink of the first color is a first process color ink;
the first ink of the second color is a second process color ink different from the first process color ink; and
the second ink is a special color ink.

3. The inkjet printer according to claim 1, wherein a number of the additional printing layer is one.

4. The inkjet printer according to claim 1, wherein:
the at least one additional printing controller includes a second printing controller;
the additional printing layer includes a second printing layer;
the image dot group includes a first image dot group including at least the ink dots, of the first ink of the first color, other than the first underlying layer dot group and a second image dot group including at least the ink dots, of the first ink of the second color, other than the second underlying layer dot group;
the moving mechanism includes a feeding mechanism to feed the recording medium;
the first color ink head, the second color ink head and the second ink ink head are located side by side in a scanning direction perpendicular to a feeding direction in which the recording medium is fed;
the first color ink head includes:
    a first color upstream nozzle array including a portion of the plurality of nozzles arrayed in the feeding direction; and
    a first color downstream nozzle array including another portion of the plurality of nozzles arrayed in the feeding direction, the first color downstream nozzle array being located downstream with respect to the first color upstream nozzle array in the feeding direction;
the second color ink head includes:
    a second color upstream nozzle array including a portion of the plurality of nozzles arrayed in the feeding direction; and
    a second color downstream nozzle array including another portion of the plurality of nozzles arrayed in the feeding direction, the second color downstream nozzle array being located downstream with respect to the second color upstream nozzle array in the feeding direction;

the second ink ink head includes:
- a second ink upstream nozzle array including a portion of the plurality of nozzles arrayed in the feeding direction; and
- a second ink downstream nozzle array including another portion of the plurality of nozzles arrayed in the feeding direction, the second ink downstream nozzle array being located downstream with respect to the second ink upstream nozzle array in the feeding direction;

in a case where the first printing layer is to be formed below the second printing layer, the first printing controller causes the nozzles of the first color upstream nozzle array to inject the first ink of the first color to form the first underlying layer dot group, causes the nozzles of the second color upstream nozzle array to inject the first ink of the second color to form the second underlying layer dot group, and causes the nozzles of the second ink upstream nozzle array to inject the second ink, to form the first printing layer; and in a case where the first printing layer is to be formed above the second printing layer, the first printing controller causes the nozzles of the first color downstream nozzle array to inject the first ink of the first color to form the first underlying layer dot group, causes the nozzles of the second color downstream nozzle array to inject the first ink of the second color to form the second underlying layer dot group, and causes the nozzles of the second ink downstream nozzle array to inject the second ink, to form the first printing layer; and in the case where the first printing layer is to be formed below the second printing layer, the second printing controller causes the nozzles of the first color downstream nozzle array to inject the first ink of the first color to form the first image dot group, and causes the nozzles of the second color downstream nozzle array to inject the first ink of the second color to form the second image dot group, to form the second printing layer; and in the case where the first printing layer is to be formed above the second printing layer, the second printing controller causes the nozzles of the first color upstream nozzle array to inject the first ink of the first color to form the first image dot group, and causes the nozzles of the second color upstream nozzle array to inject the first ink of the second color to form the second image dot group, to form the second printing layer.

5. An inkjet printer, comprising:
a recording head including:
- a first color ink head including a plurality of nozzles through which a first ink of a first color is injected toward a recording medium to form ink dots of the first ink of the first color on the recording medium;
- a second color ink head including a plurality of nozzles through which a first ink of a second color is injected toward the recording medium to form ink dots of the first ink of the second color on the recording medium; and
- a second ink ink head including a plurality of nozzles through which a second ink is injected toward the recording medium to form ink dots of the second ink on the recording medium;

a moving mechanism to move the recording head and the recording medium with respect to each other; and a controller connected with the recording head and the moving mechanism to control the recording head and the moving mechanism; wherein the controller is configured or programmed to include:
- a first setter to set a first extraction condition to extract a portion of, or an entirety of, the ink dots of the first ink of the first color;
- a second setter to set a second extraction condition to extract a portion of, or an entirety of, the ink dots of the first ink of the second color, the second extraction condition being different from the first extraction condition;
- a first extractor to extract a first underlying layer dot group from the ink dots of the first ink of the first color based on the first extraction condition;
- a second extractor to extract a second underlying layer dot group from the ink dots of the first ink of the second color based on the second extraction condition;
- a first printing controller configured or programmed to form a first printing layer, on the recording medium, of at least the first underlying layer dot group, the second underlying layer dot group and the ink dots of the second ink;
- at least one additional printing controller each forming one additional printing layer, above or below the first printing layer, of an image dot group including at least the ink dots, of the first ink of the first color, other than the first underlying layer dot group and including the ink dots, of the first ink of the second color, other than the second underlying layer dot group;

the first extraction condition is provided to extract a portion of the ink dots of the first ink of the first color as the first underlying layer dot group; and the second extraction condition is provided to extract the second underlying layer dot group such that at least a portion of the ink dots of the second underlying layer dot group is formed at positions different from positions of the ink dots of the first underlying layer dot group.

6. The inkjet printer according to claim 5, wherein the second extraction condition is provided to extract the second underlying layer dot group such that the positions of the ink dots of the first underlying layer dot group and the positions of the ink dots of the second underlying layer dot group overlap each other at a predetermined overlapping ratio.

7. The inkjet printer according to claim 5, wherein the second extraction condition is provided to extract the second underlying layer dot group such that the positions of the ink dots of the first underlying layer dot group and the positions of the ink dots of the second underlying layer dot group overlap each other at a minimum possible ratio.

8. The inkjet printer according to claim 5, wherein:
the first ink of the first color is a first process color ink;
the first ink of the second color is a second process color ink different from the first process color ink; and
the second ink is a special color ink.

9. The inkjet printer according to claim 5, wherein the controller is configured or programmed to include a mode selector to select any one of a plurality of printing modes including a first printing mode of forming the first printing layer below at least the additional printing layer and a second printing mode of forming the first printing layer above at least the additional printing layer.

10. The inkjet printer according to claim 5, wherein a number of the additional printing layer is one.

11. The inkjet printer according to claim 5, wherein:
the at least one additional printing controller includes a second printing controller;
the additional printing layer includes a second printing layer;
the image dot group includes a first image dot group including at least the ink dots, of the first ink of the first color, other than the first underlying layer dot group and a second image dot group including at least the ink dots, of the first ink of the second color, other than the second underlying layer dot group;
the moving mechanism includes a feeding mechanism to feed the recording medium;
the first color ink head, the second color ink head and the second ink ink head are located side by side in a scanning direction perpendicular to a feeding direction in which the recording medium is fed;
the first color ink head includes:
    a first color upstream nozzle array including a portion of the plurality of nozzles arrayed in the feeding direction; and
    a first color downstream nozzle array including another portion of the plurality of nozzles arrayed in the feeding direction, the first color downstream nozzle array being located downstream with respect to the first color upstream nozzle array in the feeding direction;
the second color ink head includes:
    a second color upstream nozzle array including a portion of the plurality of nozzles arrayed in the feeding direction; and
    a second color downstream nozzle array including another portion of the plurality of nozzles arrayed in the feeding direction, the second color downstream nozzle array being located downstream with respect to the second color upstream nozzle array in the feeding direction;
the second ink ink head includes:
    a second ink upstream nozzle array including a portion of the plurality of nozzles arrayed in the feeding direction; and
    a second ink downstream nozzle array including another portion of the plurality of nozzles arrayed in the feeding direction, the second ink downstream nozzle array being located downstream with respect to the second ink upstream nozzle array in the feeding direction;
in a case where the first printing layer is to be formed below the second printing layer, the first printing controller causes the nozzles of the first color upstream nozzle array to inject the first ink of the first color to form the first underlying layer dot group, causes the nozzles of the second color upstream nozzle array to inject the first ink of the second color to form the second underlying layer dot group, and causes the nozzles of the second ink upstream nozzle array to inject the second ink, to form the first printing layer; and
in a case where the first printing layer is to be formed above the second printing layer, the first printing controller causes the nozzles of the first color downstream nozzle array to inject the first ink of the first color to form the first underlying layer dot group, causes the nozzles of the second color downstream nozzle array to inject the first ink of the second color to form the second underlying layer dot group, and causes the nozzles of the second ink downstream nozzle array to inject the second ink, to form the first printing layer; and
in the case where the first printing layer is to be formed below the second printing layer, the second printing controller causes the nozzles of the first color downstream nozzle array to inject the first ink of the first color to form the first image dot group, and causes the nozzles of the second color downstream nozzle array to inject the first ink of the second color to form the second image dot group, to form the second printing layer; and
in the case where the first printing layer is to be formed above the second printing layer, the second printing controller causes the nozzles of the first color upstream nozzle array to inject the first ink of the first color to form the first image dot group, and causes the nozzles of the second color upstream nozzle array to inject the first ink of the second color to form the second image dot group, to form the second printing layer.

12. An inkjet printer, comprising:
a recording head including:
    a first color ink head including a plurality of nozzles through which a first ink of a first color is injected toward a recording medium to form ink dots of the first ink of the first color on the recording medium;
    a second color ink head including a plurality of nozzles through which a first ink of a second color is injected toward the recording medium to form ink dots of the first ink of the second color on the recording medium; and
    a second ink ink head including a plurality of nozzles through which a second ink is injected toward the recording medium to form ink dots of the second ink on the recording medium;
a moving mechanism to move the recording head and the recording medium with respect to each other; and
a controller connected with the recording head and the moving mechanism to control the recording head and the moving mechanism; wherein
the controller is configured or programmed to include:
    a first setter to set a first extraction condition to extract a portion of, or an entirety of, the ink dots of the first ink of the first color;
    a second setter to set a second extraction condition to extract a portion of, or an entirety of, the ink dots of the first ink of the second color, the second extraction condition being different from the first extraction condition;
    a first extractor to extract a first underlying layer dot group from the ink dots of the first ink of the first color based on the first extraction condition;
    a second extractor to extract a second underlying layer dot group from the ink dots of the first ink of the second color based on the second extraction condition;
    a first printing controller configured or programmed to form a first printing layer, on the recording medium, of at least the first underlying layer dot group, the second underlying layer dot group and the ink dots of the second ink;
    at least one additional printing controller each forming one additional printing layer, above or below the first printing layer, of an image dot group including at least the ink dots, of the first ink of the first color, other than the first underlying layer dot group and including the ink dots, of the first ink of the second color, other than the second underlying layer dot group;

the first extraction condition includes a first extraction ratio, which is a ratio of the first underlying layer dot group with respect to the ink dots of the first ink of the first color;

the second extraction condition includes a second extraction ratio, which is a ratio of the second underlying layer dot group with respect to the ink dots of the first ink of the second color; and the first extraction ratio and the second extraction ratio are equal to each other.

13. The inkjet printer according to claim 1, wherein the controller is configured or programmed to include a mode selector to select any one of a plurality of printing modes including a first printing mode of forming the first printing layer below at least the additional printing layer and a second printing mode of forming the first printing layer above at least the additional printing layer.

14. The inkjet printer according to claim 12, wherein:
the first ink of the first color is a first process color ink;
the first ink of the second color is a second process color ink different from the first process color ink; and
the second ink is a special color ink.

15. The inkjet printer according to claim 12, wherein the controller is configured or programmed to include a mode selector to select any one of a plurality of printing modes including a first printing mode of forming the first printing layer below at least the additional printing layer and a second printing mode of forming the first printing layer above at least the additional printing layer.

16. The inkjet printer according to claim 12, wherein a number of the additional printing layer is one.

17. The inkjet printer according to claim 12, wherein:
the at least one additional printing controller includes a second printing controller;
the additional printing layer includes a second printing layer;
the image dot group includes a first image dot group including at least the ink dots, of the first ink of the first color, other than the first underlying layer dot group and a second image dot group including at least the ink dots, of the first ink of the second color, other than the second underlying layer dot group;
the moving mechanism includes a feeding mechanism to feed the recording medium;
the first color ink head, the second color ink head and the second ink ink head are located side by side in a scanning direction perpendicular to a feeding direction in which the recording medium is fed;
the first color ink head includes:
a first color upstream nozzle array including a portion of the plurality of nozzles arrayed in the feeding direction; and
a first color downstream nozzle array including another portion of the plurality of nozzles arrayed in the feeding direction, the first color downstream nozzle array being located downstream with respect to the first color upstream nozzle array in the feeding direction;

the second color ink head includes:
a second color upstream nozzle array including a portion of the plurality of nozzles arrayed in the feeding direction; and
a second color downstream nozzle array including another portion of the plurality of nozzles arrayed in the feeding direction, the second color downstream nozzle array being located downstream with respect to the second color upstream nozzle array in the feeding direction;

the second ink ink head includes:
a second ink upstream nozzle array including a portion of the plurality of nozzles arrayed in the feeding direction; and
a second ink downstream nozzle array including another portion of the plurality of nozzles arrayed in the feeding direction, the second ink downstream nozzle array being located downstream with respect to the second ink upstream nozzle array in the feeding direction;

in a case where the first printing layer is to be formed below the second printing layer, the first printing controller causes the nozzles of the first color upstream nozzle array to inject the first ink of the first color to form the first underlying layer dot group, causes the nozzles of the second color upstream nozzle array to inject the first ink of the second color to form the second underlying layer dot group, and causes the nozzles of the second ink upstream nozzle array to inject the second ink, to form the first printing layer; and in a case where the first printing layer is to be formed above the second printing layer, the first printing controller causes the nozzles of the first color downstream nozzle array to inject the first ink of the first color to form the first underlying layer dot group, causes the nozzles of the second color downstream nozzle array to inject the first ink of the second color to form the second underlying layer dot group, and causes the nozzles of the second ink downstream nozzle array to inject the second ink, to form the first printing layer; and in the case where the first printing layer is to be formed below the second printing layer, the second printing controller causes the nozzles of the first color downstream nozzle array to inject the first ink of the first color to form the first image dot group, and causes the nozzles of the second color downstream nozzle array to inject the first ink of the second color to form the second image dot group, to form the second printing layer; and in the case where the first printing layer is to be formed above the second printing layer, the second printing controller causes the nozzles of the first color upstream nozzle array to inject the first ink of the first color to form the first image dot group, and causes the nozzles of the second color upstream nozzle array to inject the first ink of the second color to form the second image dot group, to form the second printing layer.

* * * * *